United States Patent
Simon et al.

(10) Patent No.: US 10,609,898 B2
(45) Date of Patent: Apr. 7, 2020

(54) ANIMAL FOOD DISPENSER

(71) Applicant: Doskocil Manufacturing Company, Arlington, TX (US)

(72) Inventors: David Simon, Lakeland, FL (US); David Veness, Fort Worth, TX (US); Nicholas Baker, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 269 days.

(21) Appl. No.: 15/334,936

(22) Filed: Oct. 26, 2016

(65) Prior Publication Data

US 2017/0112092 A1 Apr. 27, 2017

Related U.S. Application Data

(60) Provisional application No. 62/372,426, filed on Aug. 9, 2016, provisional application No. 62/246,158, filed on Oct. 26, 2015.

(51) Int. Cl.
*A01K 5/01* (2006.01)
*A01K 15/02* (2006.01)

(52) U.S. Cl.
CPC .......... *A01K 5/0114* (2013.01); *A01K 15/025* (2013.01)

(58) Field of Classification Search
CPC ... A01K 5/0114; A01K 5/0135; A01K 15/025
See application file for complete search history.

(56) References Cited

U.S. PATENT DOCUMENTS

| | | | | |
|---|---|---|---|---|
| 1,190,028 | A * | 7/1916 | Smith | A01K 5/0241 |
| | | | | 119/53.5 |
| 5,957,082 | A * | 9/1999 | Budman | A01K 5/0114 |
| | | | | 119/54 |
| 9,161,514 | B2 * | 10/2015 | Baxter | A01K 5/0291 |
| 2006/0000418 | A1 | 1/2006 | Kubala et al. | |
| 2008/0178813 | A1 * | 7/2008 | Lescroart | A01K 5/0114 |
| | | | | 119/51.01 |
| 2016/0037744 | A1 * | 2/2016 | Rudin | A01K 1/0353 |
| | | | | 119/28.5 |
| 2016/0120146 | A1 * | 5/2016 | Parness | A01K 5/0114 |
| | | | | 119/61.4 |
| 2016/0229590 | A1 * | 8/2016 | Smaldone | A01K 5/0135 |
| 2016/0316719 | A1 * | 11/2016 | Parness | A01K 15/025 |

FOREIGN PATENT DOCUMENTS

| | | |
|---|---|---|
| DE | 202006012110 U1 | 2/2007 |
| GB | 2482142 A | 1/2012 |

OTHER PUBLICATIONS

Extended European Search Report dated Dec. 11, 2017 in corresponding European Patent Application No. 17184989.

* cited by examiner

*Primary Examiner* — Richard G Davis
(74) *Attorney, Agent, or Firm* — Global IP Councelors, LLP

(57) ABSTRACT

An animal food dispenser, includes a base portion and a roller portion. The base portion has first and second upwardly extending members. The roller portion has an opening, and is configured to be held by the upwardly extending members such that the roller portion is capable of freely rotating and dispensing food through the opening.

14 Claims, 12 Drawing Sheets

ANIMAL FOOD DISPENSER

CROSS REFERENCE TO RELATED APPLICATIONS

This application claims the benefit of Application Ser. No. 62/372,426, filed Aug. 9, 2016 and Application Ser. No. 62/246,158, filed Oct. 26, 2015, the contents of each of which are herein incorporated by reference.

BACKGROUND

Object of the Invention

The present invention is directed to an animal food dispenser. In particular, the present invention related to an animal food dispenser that selectively dispenses animal food.

Description of Related Art

Animal toys that dispense animal treats when the toy is rolled or otherwise manipulated are generally known. Such structures have a variety of forms and arrangements of holes and openings These treat-discharging toys are generally comprised of a wall that forms a hollow body which is configured for rolling and which has an interior cavity and one or more openings being dimensioned and configured for passage of animal treats into and out of the cavity.

SUMMARY

Many animals have a relatively short attention span and are easily bored. It would be desirable for a food dispenser to sustain an animal's attention for longer periods of time than previous toys. Moreover, many animals eat too fast. What is needed is a new type of food dispenser which dispenses food differently from those already known, thereby sparking an animal's interest for longer periods of time and/or increasing the time frame in which an animal may eat. Such an animal food dispenser includes a base portion and a roller portion. The base portion has first and second upwardly extending members. The roller portion has an opening, and is configured to be held by the upwardly extending members such that the roller portion is capable of freely rotating and dispensing food through the opening.

BRIEF DESCRIPTION OF THE DRAWINGS

The invention will be explained in more detail hereinafter with reference to the drawings.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
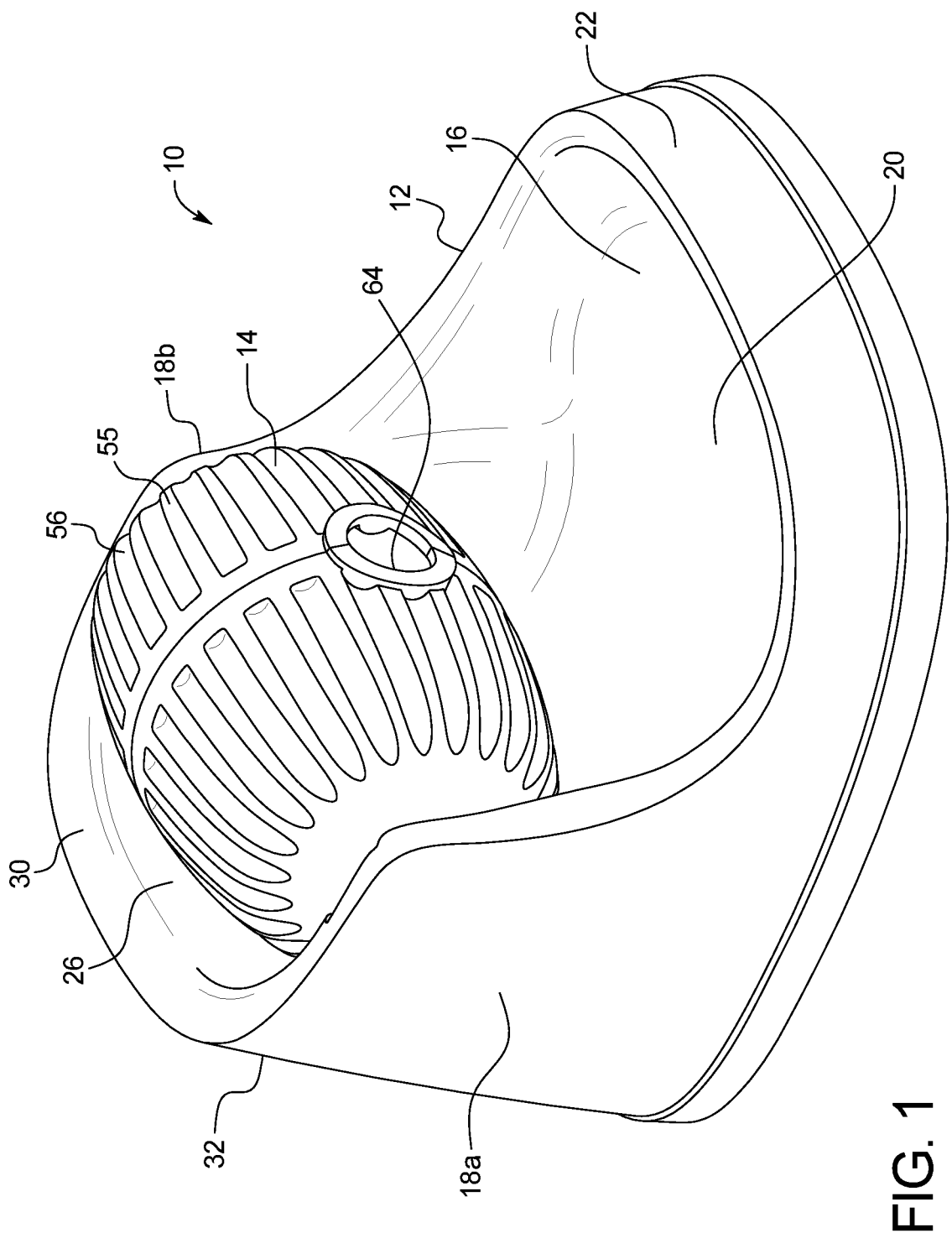
FIG. 1 illustrates a top perspective view of food dispenser according to an embodiment of the present invention.
Figure 2:
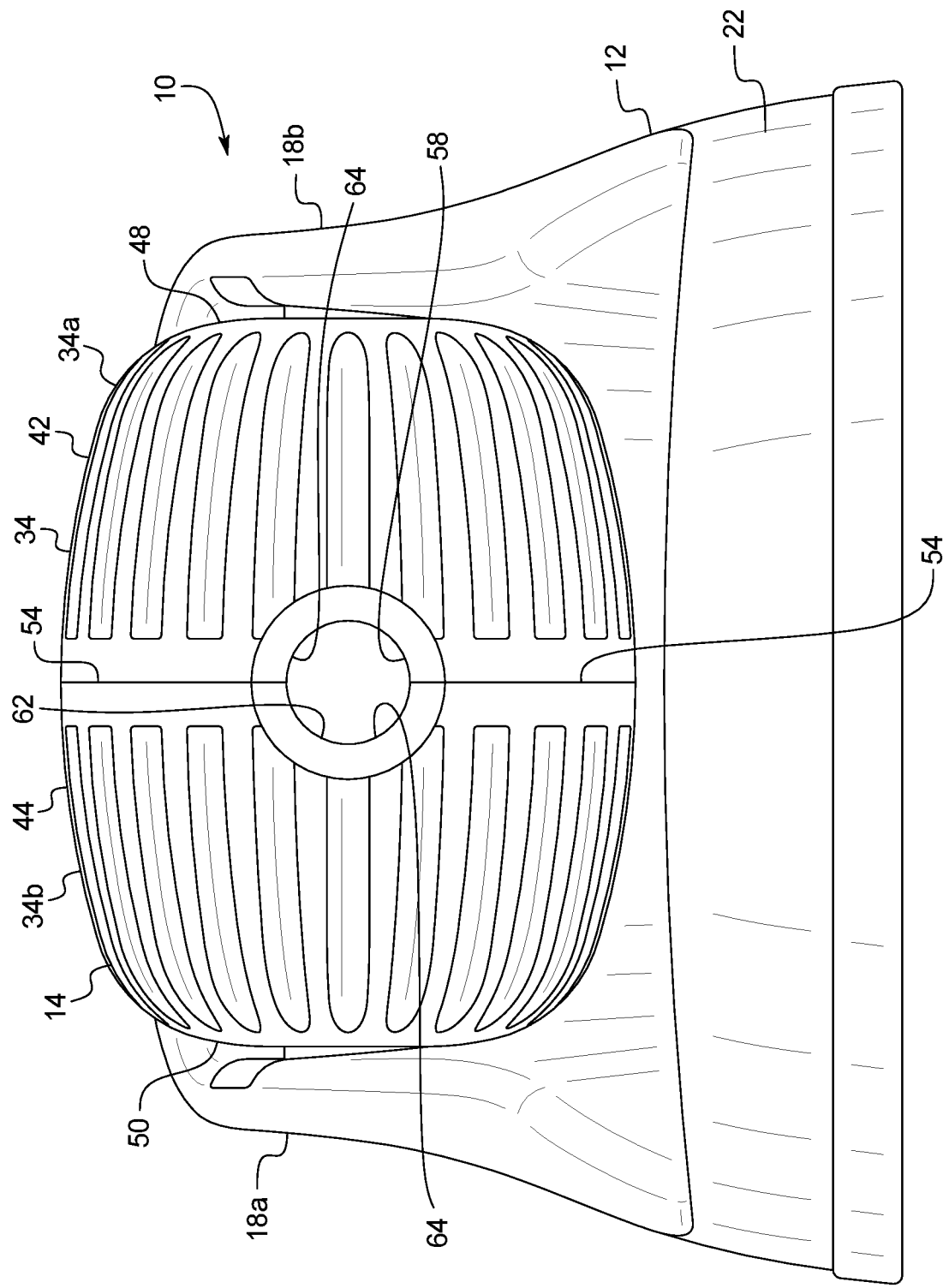
FIG. 2 illustrates a front elevational view of the food dispenser of FIG. 1.
Figure 3:
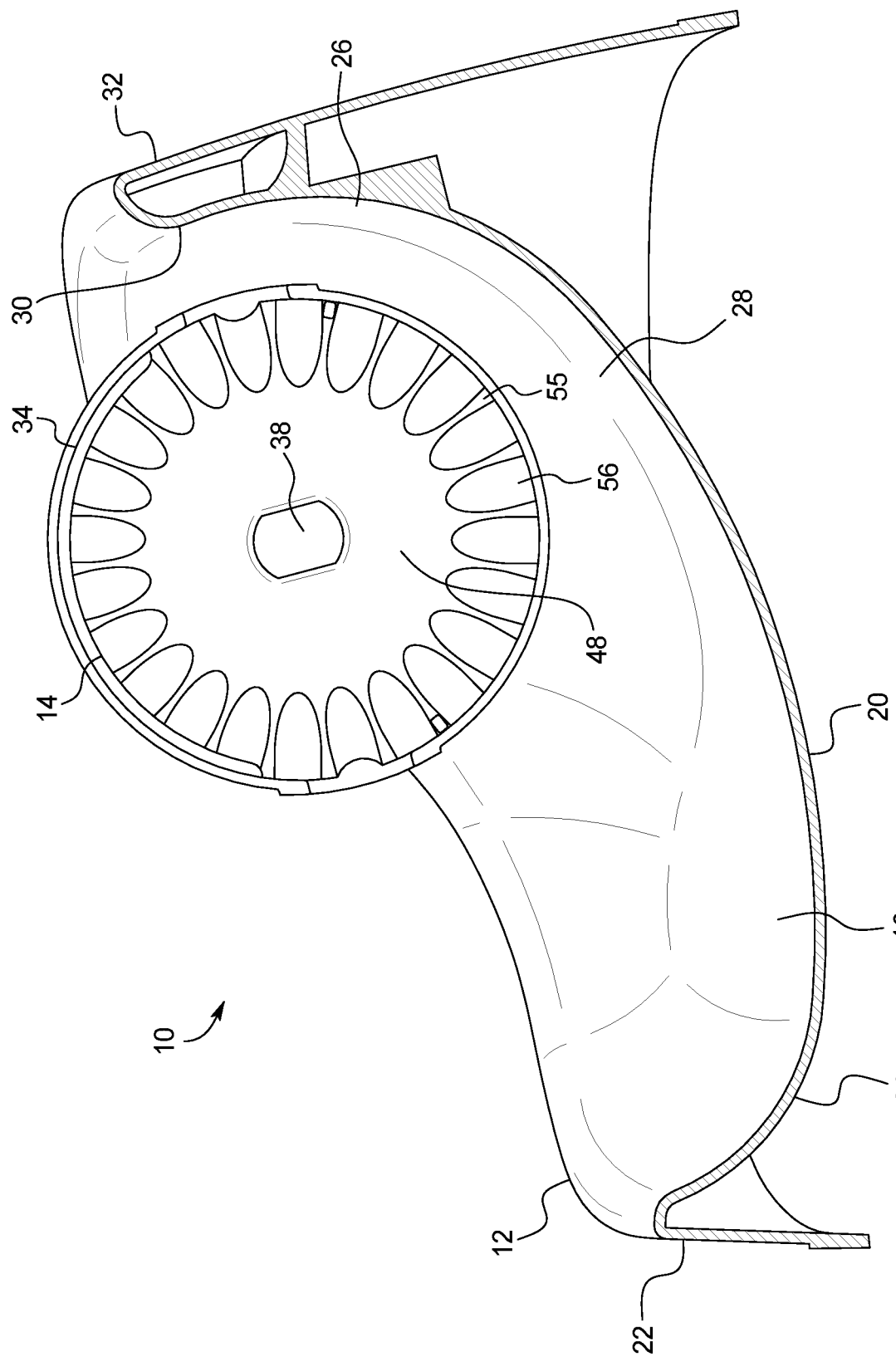
FIG. 3 illustrates a side sectional view of the food dispenser of FIG. 1.
Figure 4:
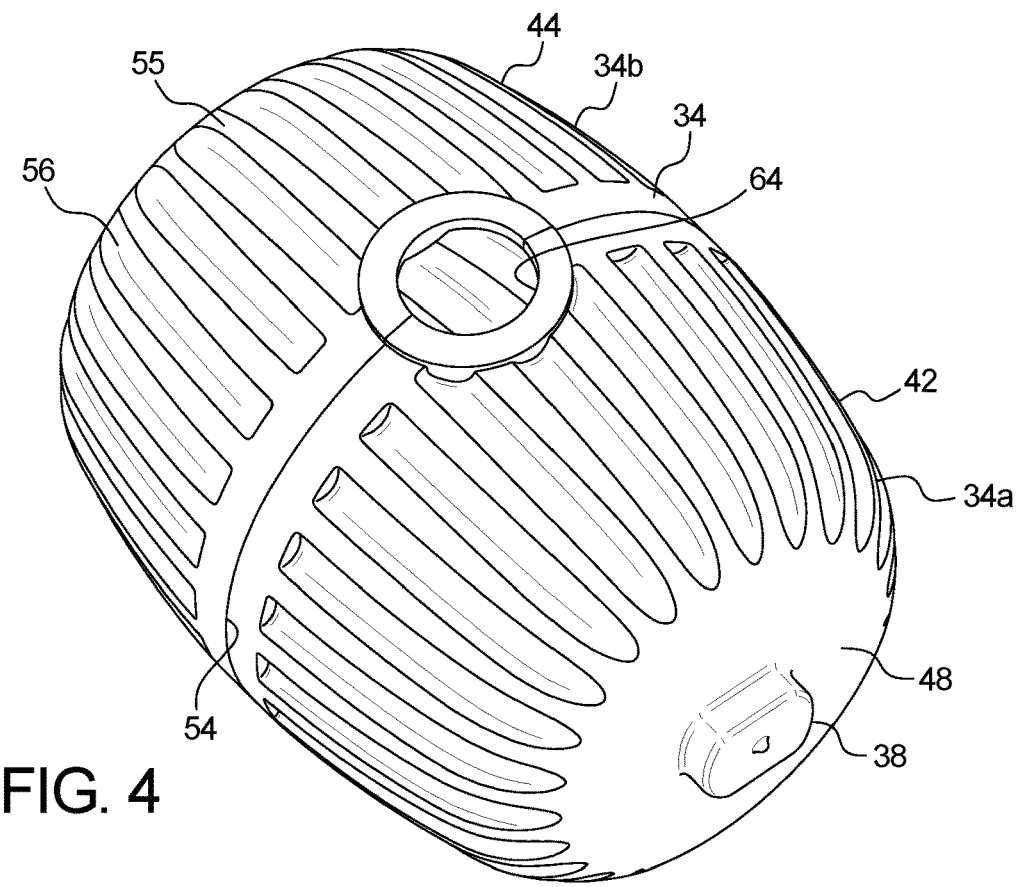
FIG. 4 is a top perspective view of the roller portion of the food dispenser of FIG. 1.
Figure 5:
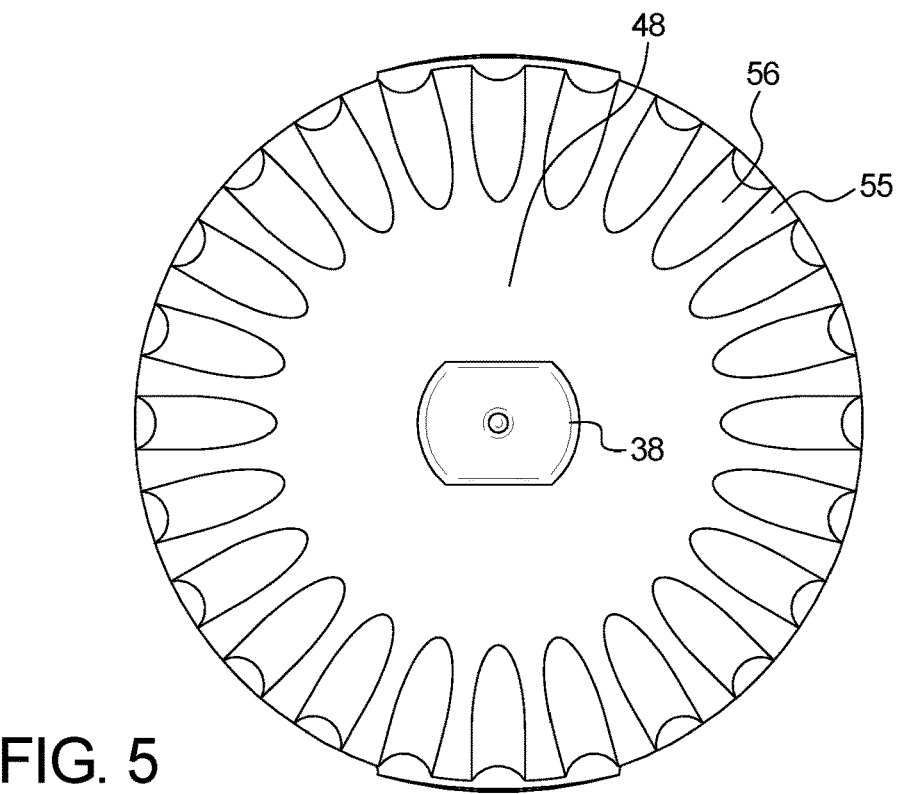
FIG. 5 is a side elevational view of the roller portion of FIG. 4.

Referring initially to FIGS. 1-3, a food dispenser 10 is illustrated in accordance with a first embodiment. In this embodiment, the food dispenser includes a base portion 12 and a roller portion 14.

Figure 7:
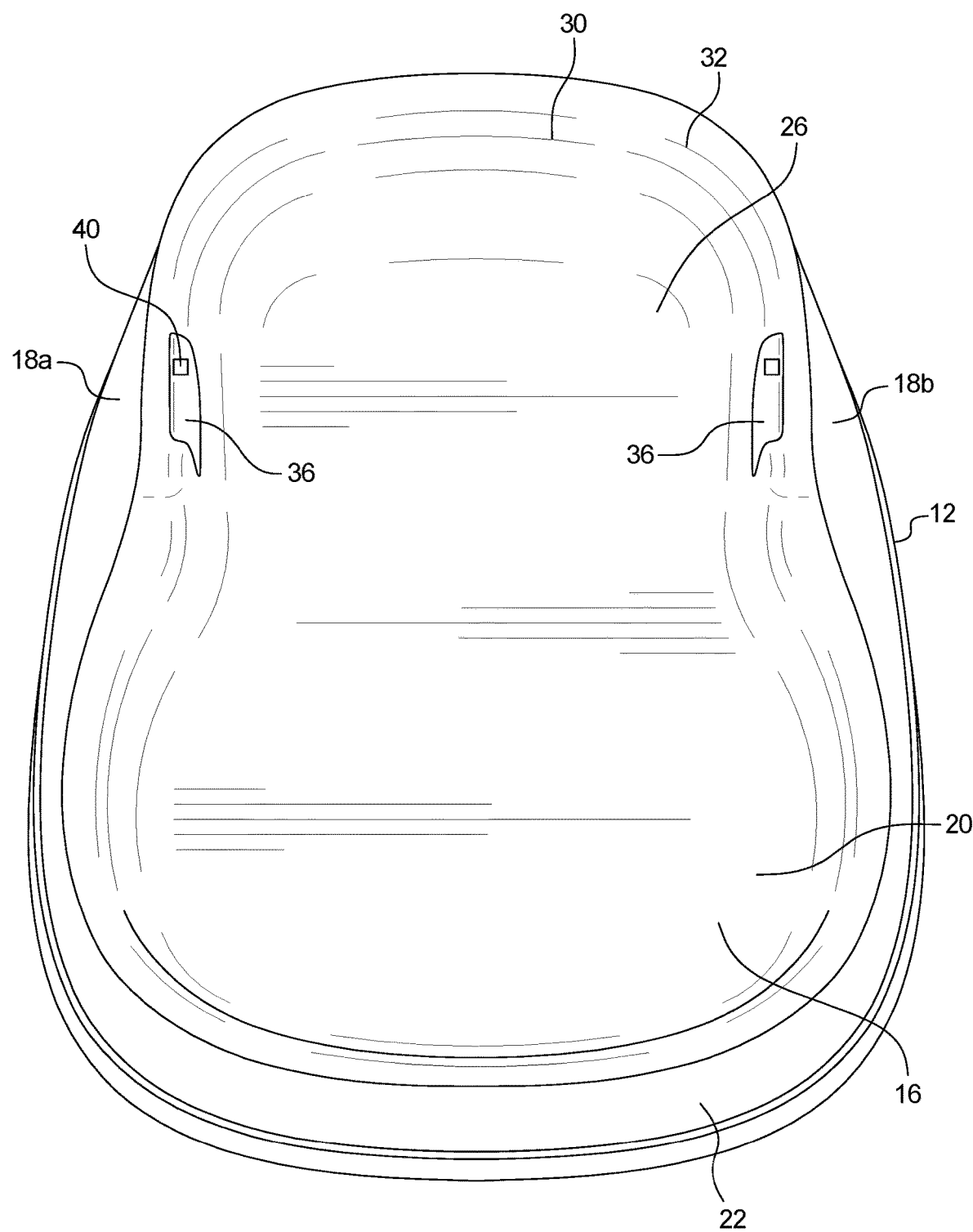
FIG. 7 is a top plan view of the base of the food dispenser of FIG. 1.
Figure 10:
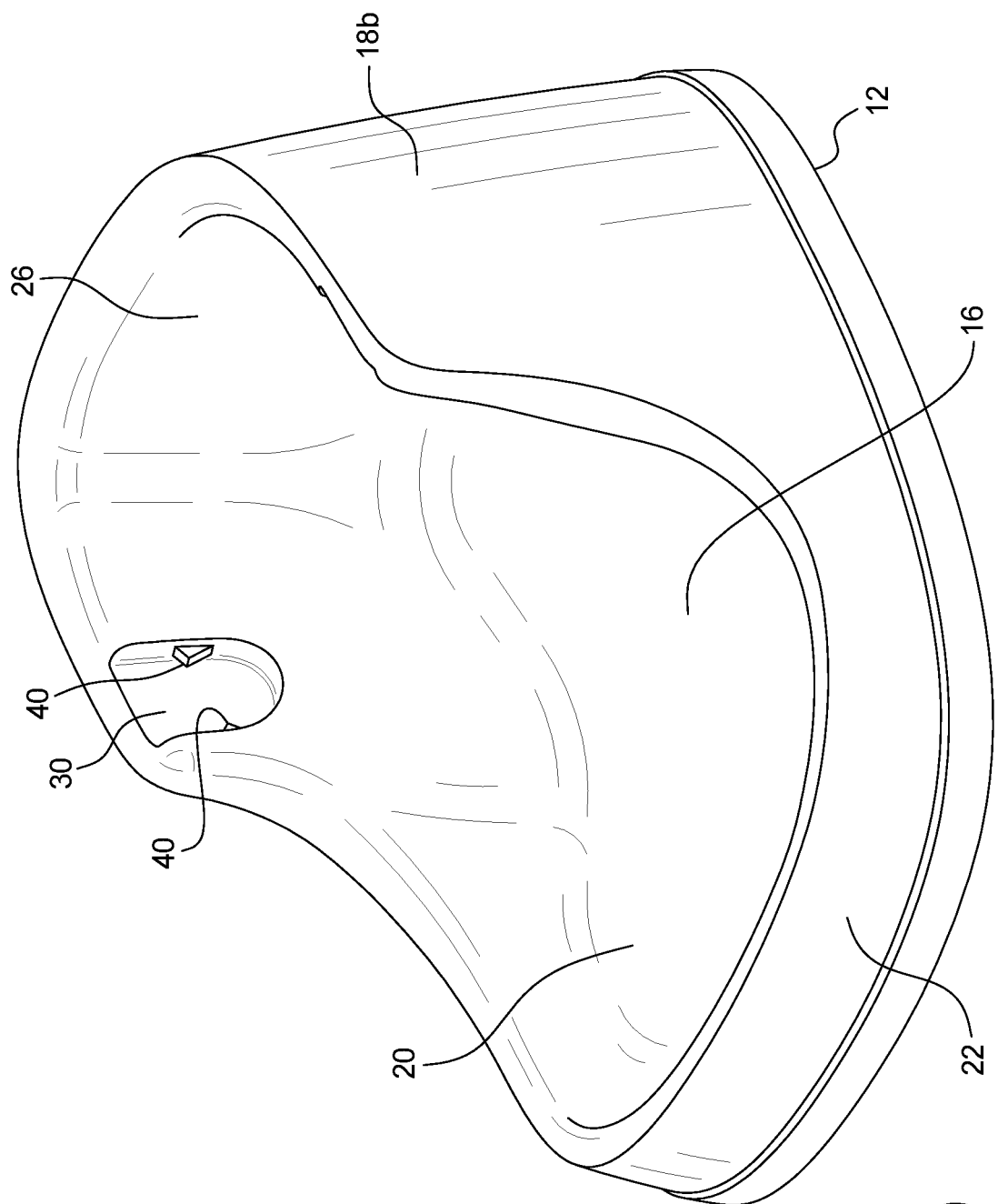
FIG. 10 is a side perspective view of the base of FIG. 7.
Figure 11:
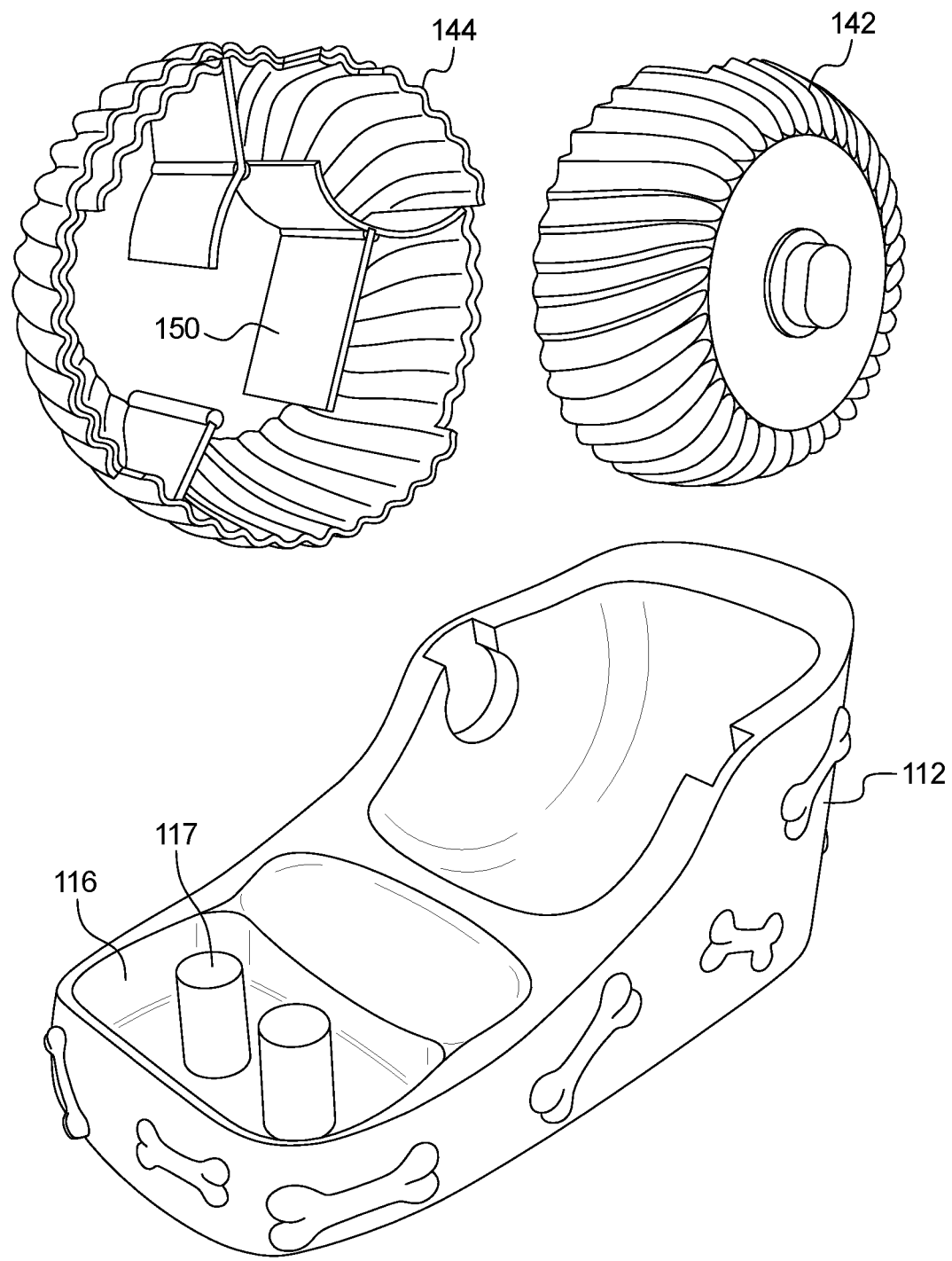
FIG. 11 is an exploded view of a second embodiment of a food dispenser.
Figure 12:
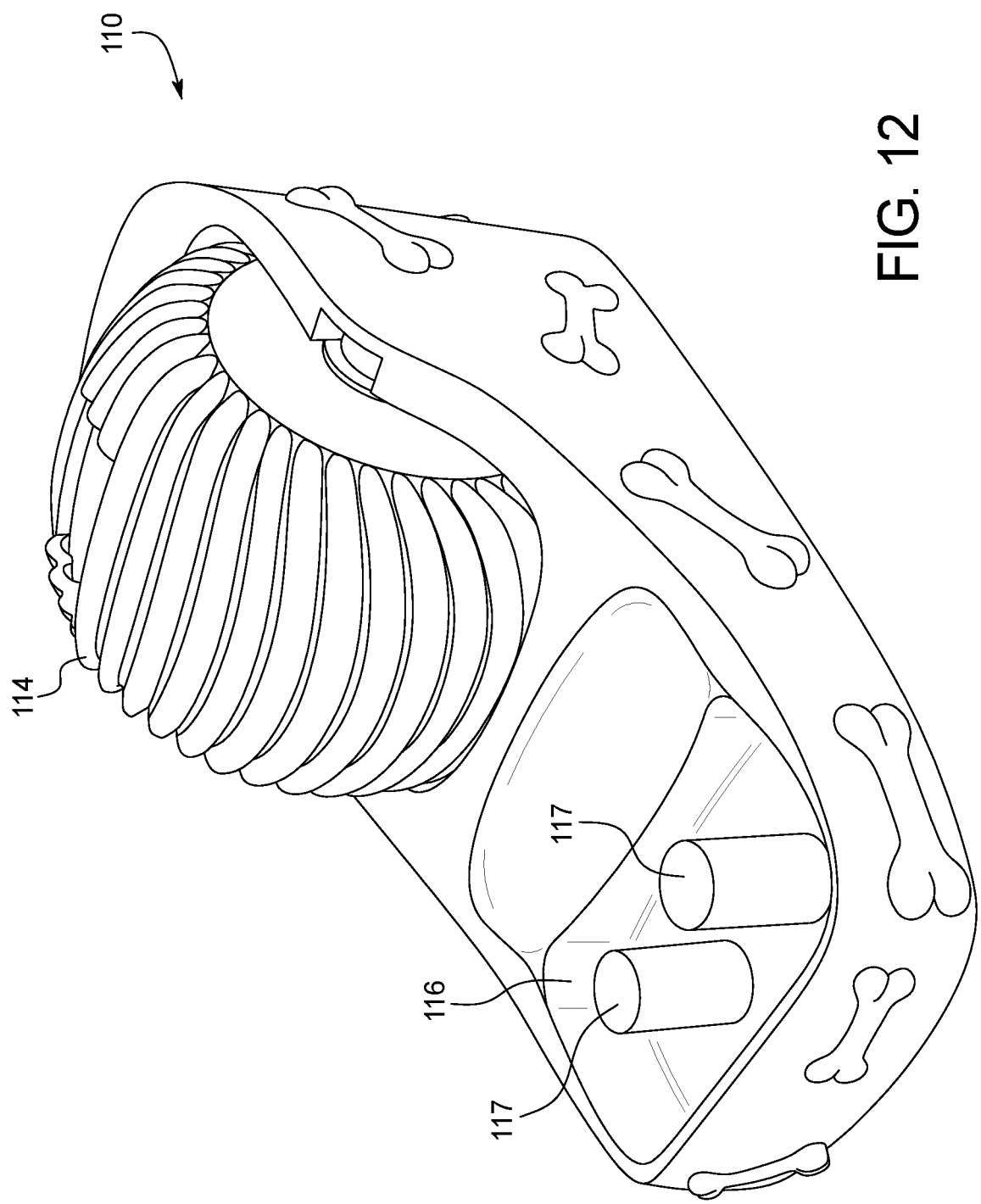
FIG. 12 is top perspective view of the food dispenser of FIG. 11.
Figure 13:
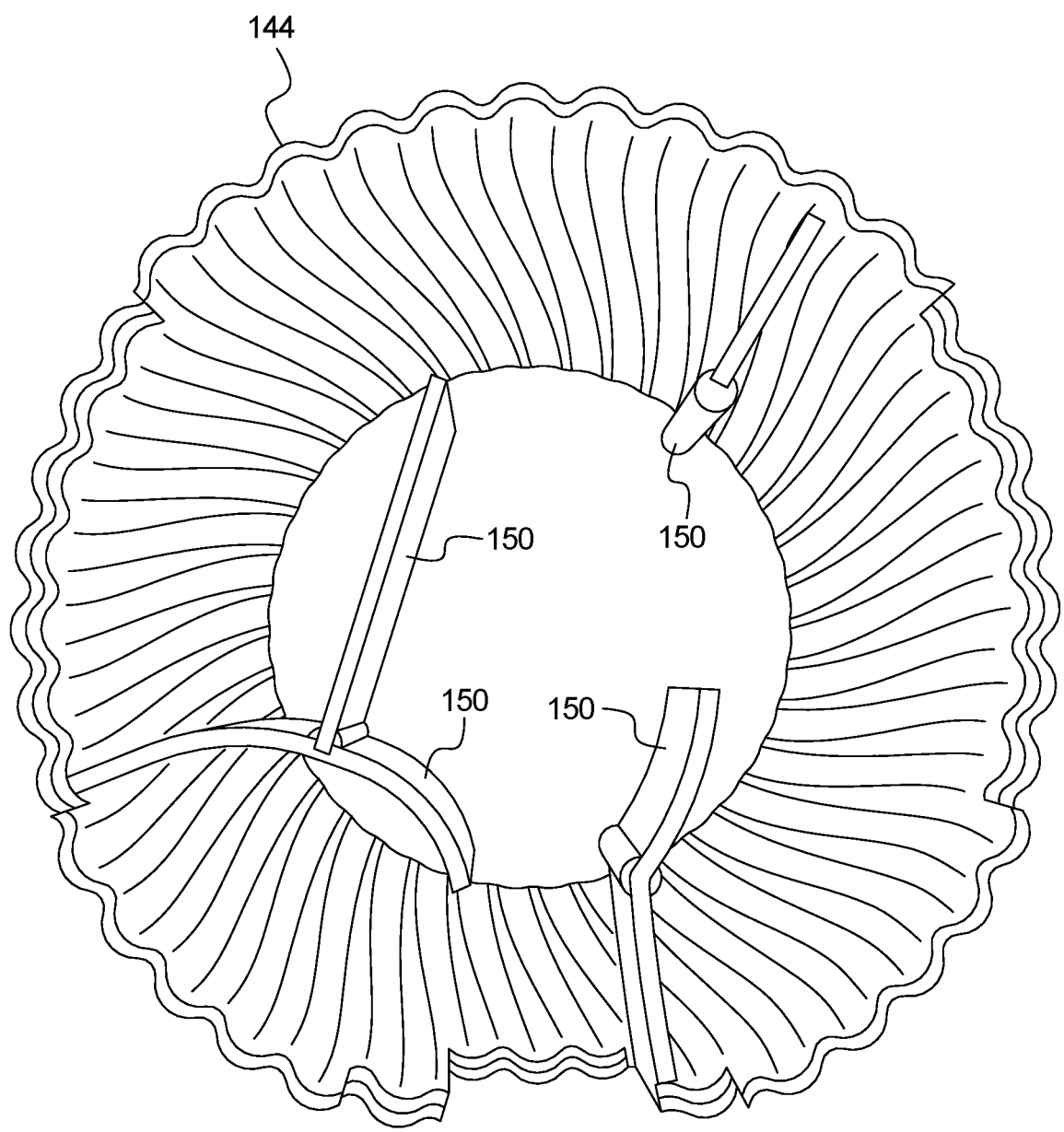
FIG. 13 is a side elevation view of a roller member of the roller portion of FIG. 11.
Figure 14:
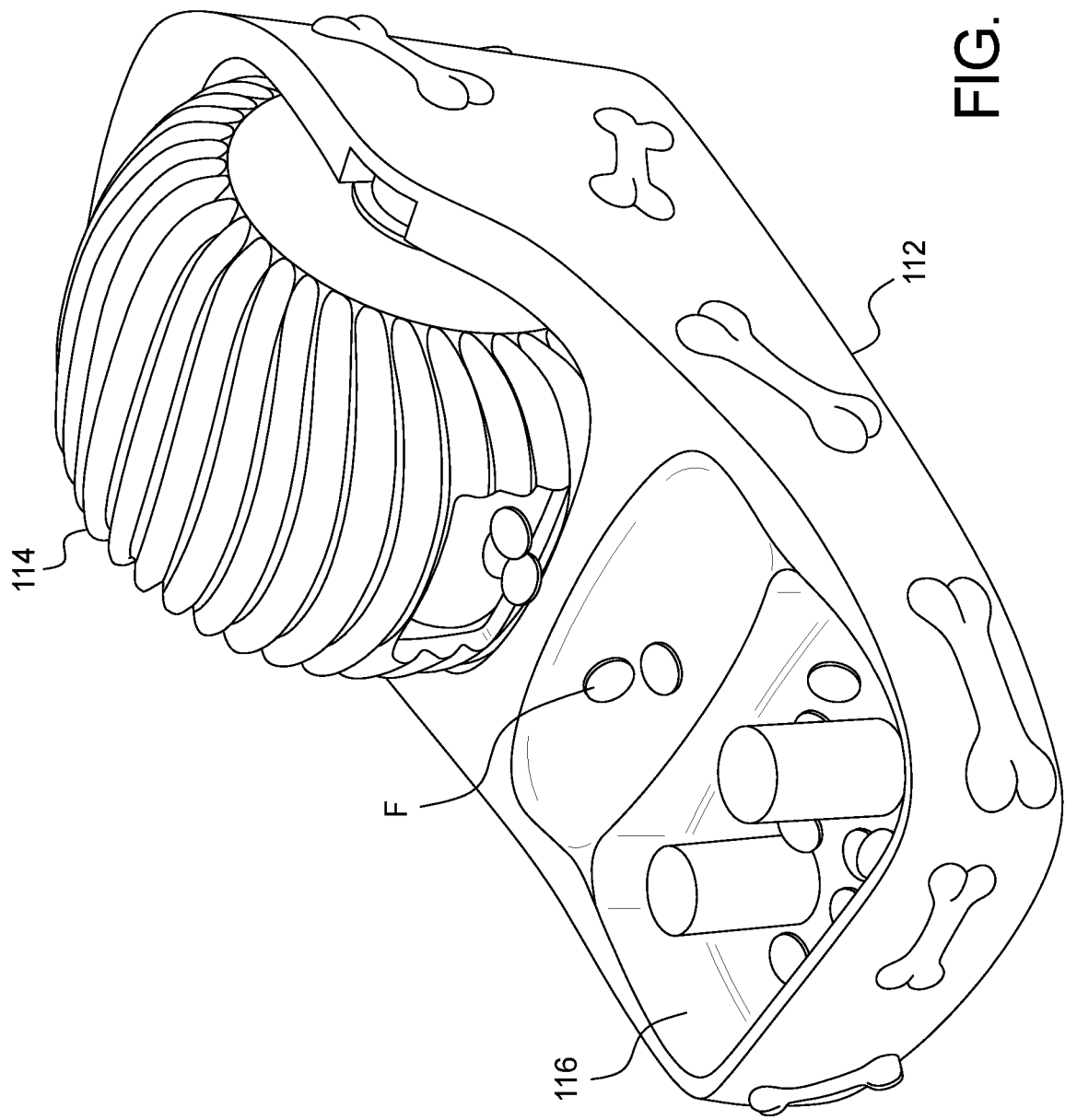
FIG. 14 is a top perspective view of the food dispenser of FIG. 11 dispensing food.

As shown in FIGS. 7 and 10, the base portion 12 is preferably a plastic injection molded member. In one embodiment, the base portion 12 includes a receiving section 16 configured to receive food F (e.g., pet treats or the like—see FIG. 12) and two upwardly extending members 18a and 18b. The receiving section 16 has a generally flat part 20 with a wall 22 to retain the food. The receiving section 16 can have any suitable configuration including a bowl like configuration, as long as the receiving section 16 is capable of receiving and/or retaining food therein. The wall 22 is preferably a vertical wall at a circumference 24 of the receiving section 16. The receiving section 16 also includes an upwardly extending part 26 configured to prevent food from exiting the food dispenser 10. The upwardly extending part 26 and the flat part 20 are connected by a curved area 28 that enables the food to slide due to gravity into the flat part 20. Preferably, the flat part 20, the upwardly extending part 26 and the curved area 28 are unitary or one piece, but can be formed in any suitable manner.

In one embodiment, the upwardly extending part 26 can follow the contour (or outer circumferential surface 34) of the roller portion 14 to maintain any dispensed food in the base portion 12. In one embodiment, the upwardly extending part 26 has a lip portion 30 at an upper end 32 thereof. The lip portion 30 extends inwardly toward the outer circumferential surface 34 of the roller portion 14 to maintain the food portion in the base portion 12. The lip portion 30 can extend in this manner any suitable distance.

As shown in FIGS. 7 and 10, the upwardly extending members 18a and 18b are preferably arm members that are configured to hold the roller portion 14 above the receiving section 16 so that the roller portion 14 is capable of rotating. Each of the upwardly extending members 18a and 18b generally has a length that is greater than the radius of the roller portion 14. Further each of the upwardly extending members 18a and 18b has a notch or groove 36 configured to receive a protrusion 38 from the roller portion 14. The notch 36 enables the roller portion 14 to freely rotate above or adjacent the receiving portion 16. As shown in FIG. 10, the notch 36 can have a protrusion 40 that is configured to hold the protrusion 38 of the roller portion 14 in the notch 36.

As shown in FIGS. 2-6, 8 and 9, the roller portion 14 preferably is generally elliptical in shape (or "pill" shaped) and includes a first end 48 and a second end 50. The first end 48 and the second end 50 are generally flat with a protrusion 38 thereon. Moreover, the roller portion 14 is formed from a first hemispherical portion 42 and a second hemispherical portion 44 that is detachably coupled to the first hemispherical portion 42. Each of the first and second hemispherical portions 42 and 44 are preferably molded plastic. In one embodiment the hemispherical portions 42 and 44 can be transparent; however, it is noted that hemispherical portions can be opaque and any suitable color.

Each of the hemispherical portions 42 and 44 have an outer circumferential surface 34a and 34b that forms the outer circumferential surface 34 of the roller portion 14. The hemispherical portions 42 and 44 defines a cavity 46 therein. The hemispherical portions 42 and 44 are generally arcuate with generally ends 48 and 50, respectively. The hemispherical portions 42 and 44 are generally circular in cross section, with an increasing diameter from the flat ends 40 and 50 end towards the open end 52. The open ends 52 include a circumferential edge 54 to facilitate coupling of the hemispherical portions 42 and 44 together. When the circumferential edges 54 of the first and second hemispherical portions 42 and 44 are joined, the hemispherical portions 42 and 44 form the roller portion 14 with interior space or cavity 46 configured to receive animal food. The outer circumferential surface 34 includes ridges 55 and/or grooves 56 that enable the animal to engage the roller portion 14 to more easily rotate the roller portion 14.

As discussed above, the protrusions 38 are sized and configured to be disposed in the notch portion 36 of a respective upwardly extending member 18a and 18b to enable the roller portion 14 to freely rotate above or adjacent the receiving portion 16.

Figure 6:
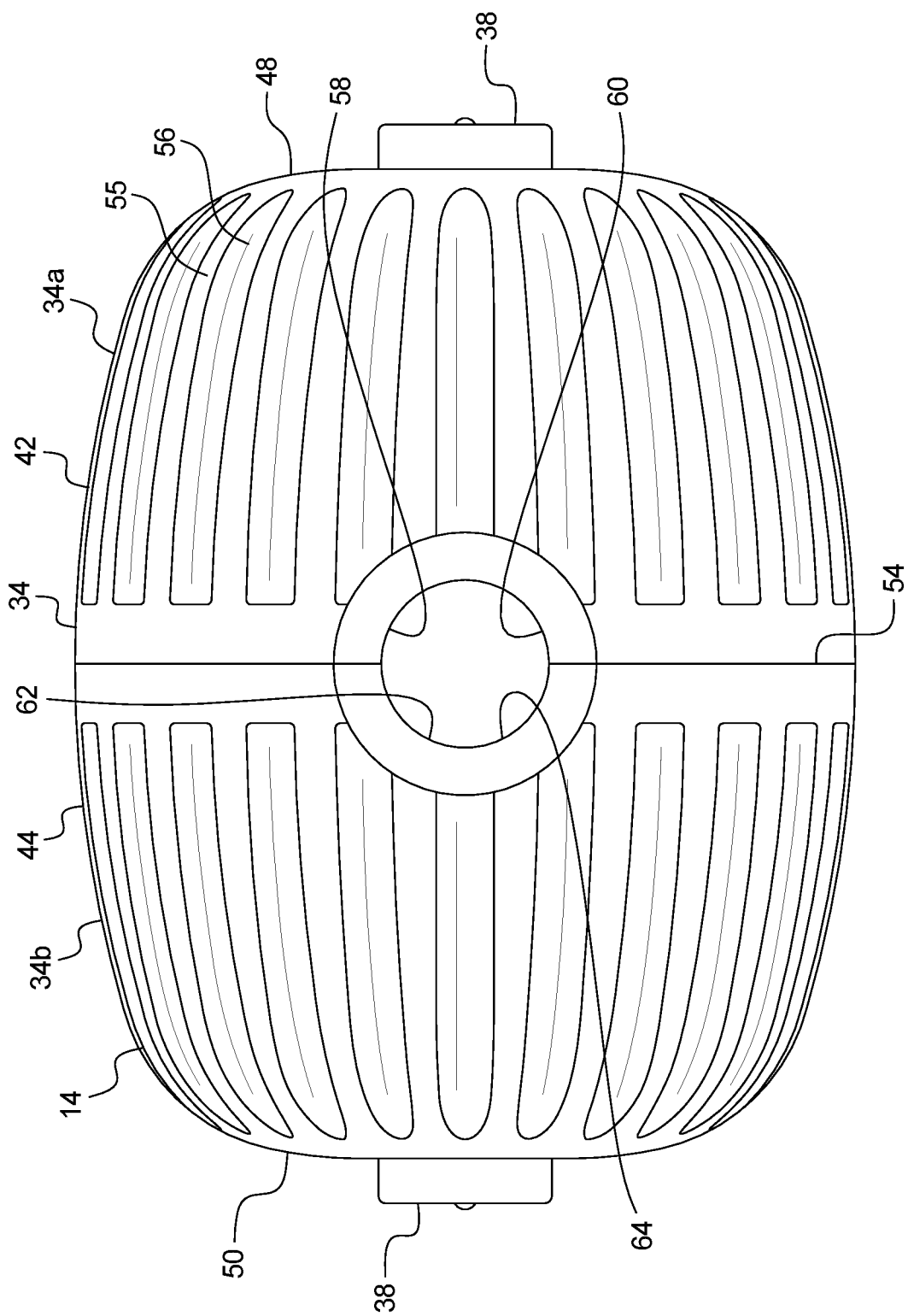
FIG. 6 is top plan view of the roller portion of FIG. 4.

The outer circumferential surface 34 of each of the roller portion 14 includes a notch or opening 58. As shown in FIG. 6, the notch 58 includes two arcuate sides 60 and 62 connected together 4. The arcuate sides 60 and 62 open at the circumferential edges 54. Thus, when the hemispherical portions 42 and 44 are joined, the notches 58 form an elliptical or circular opening 64 that enables food to pass through the opening 64 and into the receiving section 16. In this embodiment, only two openings are illustrated; however, the outer circumferential surface 34 of the roller portion 14 can include a single opening or a plurality of openings (2 or more in any suitable configuration). In one illustrated embodiment, the outer circumferential surface 34 of the roller portion 14 can include two openings offset from each other by 180 degrees.

Figure 8:
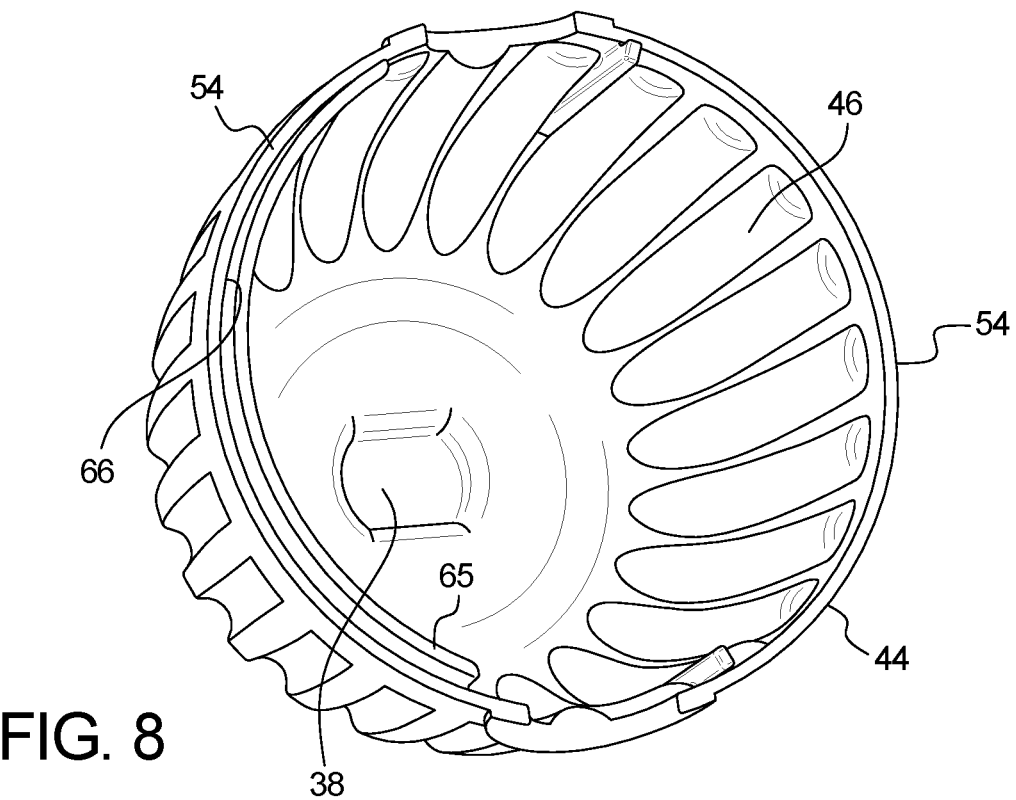
FIG. 8 is a perspective view of a roller member of the roller portion of FIG. 4.
Figure 9:
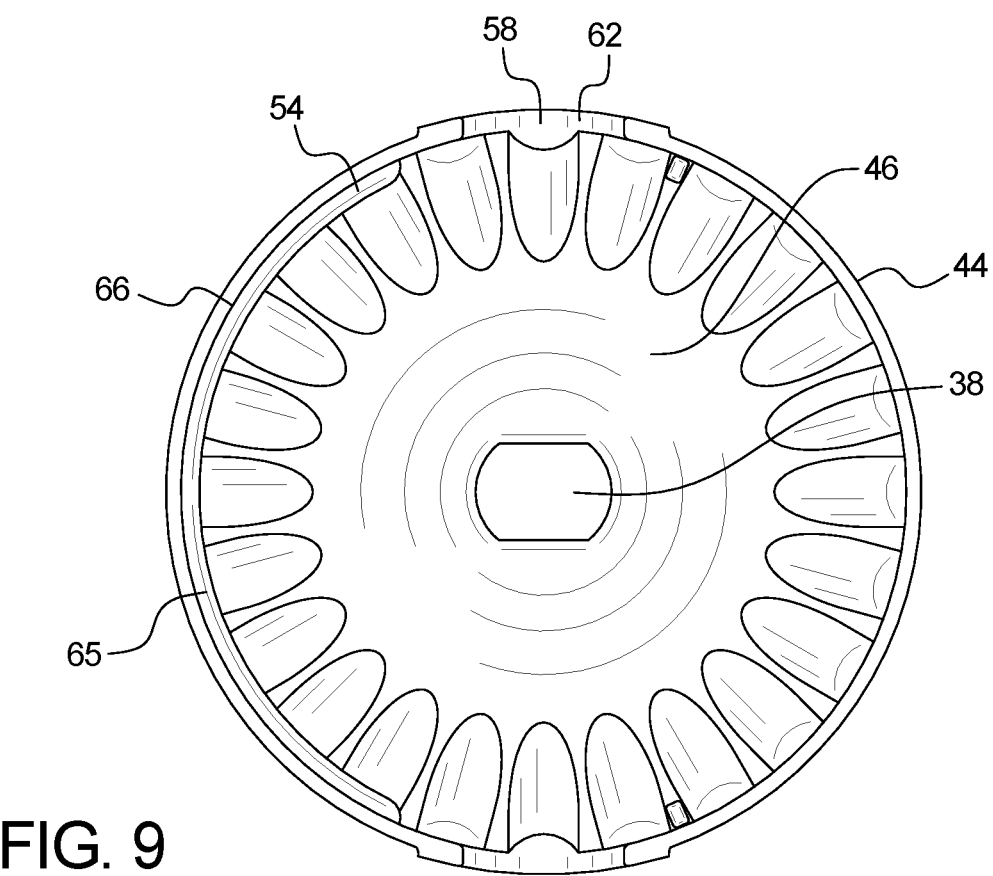
FIG. 9 is a side elevational view of the roller member of FIG. 8.

As shown in FIGS. 8 and 9, the first and second hemispherical portions 42 and 44 include an engaging member 64 extending in a longitudinal direction from the circumferential edge. In this embodiment this embodiment, the engaging member 65 is a single acruate protrusion or ridge that extends along an inward portion 66 of the circumferential edge 54; however, the engaging member 64 can be a plurality of protrusions (e.g., five protrusions) equally spaced around the circumferential edge 54.

As can be understood, each engaging member 64 of the first and second hemispherical portions 42 and 44 preferably has a corresponding shape and structure, so as to form an interference fit with the other of the first and second hemispherical portions 42 and 44, thereby enabling the first and second hemispherical portions to couple together. In one embodiment, each of the first and second hemispherical portions 42 and 44 can have a groove that is configured to receive a respective engaging member to form the interference fit.

It is noted that the coupling of the first and second hemispherical portions can be achieved in any suitable manner and any description herein is merely exemplary.

In operation the first and second hemispherical portions 42 and 44 can be uncoupled and food can be inserted therein. The first and second hemispherical portions 42 and 44 can then be coupled together to form the roller portion 14, which is inserted into the base portion 12. That is, the protrusions 38 on each of the first and second hemispherical portions 42 and 44 are inserted into respective notches 36 of the upwardly extending members 18a and 18b, enabling the roller portion 14 to freely rotate.

Thus, as can be understood, an animal can then manipulate the roller portion 14 using a paw. The paw of the animal can grip the ridges or grooves 55 and 56 on the outer surface 34 of the roller portion 14, and rotate the roller portion 14. As one of the openings 64 in the roller portion 14 is moved in a downward direction, gravity will cause some the food in the cavity 46 to fall out of one of the openings 64, while allowing other food to remain within the cavity 46. As the animal manipulates the roller portion 14 further additional food will continue to exit the cavity 46 of the roller portion 14.

Therefore, the present invention is an animal food dispenser that will sustain an animal's attention for longer periods of time than previous toys, sparking an animal's interest for longer periods of time. Additionally, the animal food dispenser will increase the time frame in which an animal will eat. Such an increase in eating times may facilitate weight monitoring or reduction in animals.

As shown in FIGS. 11-14, additional configurations of the food dispenser 110 are possible. That is, the food receiving portion 116 can be separate from a roller receiving portion and include cylindrical protrusions 117 that can inhibit an animal from removing food from the receiving portion. In this embodiment, the configuration can increase the animal interest in the dispenser and prolong the eating of the food. The roller portion 114 in this embodiment is configured to prevent the food from exiting the roller portion until in a position that would enable the food to be dispensed into the receiving portion.

In this embodiment, each of the first and second hemispherical portions 142 and 144 have a series of flanges or deflectors 150 that prevent the food from existing the roller portion 114. Thus, the animal will be required to further manipulate the roller portion 114 to dispense the food. In this embodiment, the flanges 150 in each of the first and second hemispherical portions 142 and 144 can correspond to form a maze structure or be a series of random flanges.

It is noted that unless otherwise described herein the portion of the food dispenser 10 described above can correspond the food dispenser 110.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Accordingly, these terms, as utilized to describe the present invention should be interpreted relative to a animal food dispenser.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An animal food dispenser, comprising:
   a base portion having first and second upwardly extending members, a first end, a second end, a receptacle portion disposed at the first end, and a vertical wall disposed at the second end and extending from the receptacle portion; and
   a roller portion having an opening, and configured to be held by the upwardly extending members such that the roller portion is capable of freely rotating about a center rotational axis with respect to the base portion, the roller portion capable of dispensing food through the opening that opens in a direction that is perpendicular to the center rotational axis of the roller portion,
   the roller portion comprising a first hemispherical part and a second hemispherical part removably attached to the first hemispherical part, the opening being defined by a first arcuate side of the first hemispherical part and a second arcuate side of the second hemispherical part, the first hemispherical part has a first protrusion that sits on the first upwardly extending member, the second hemispherical part having a second protrusion that sits on the second upwardly extending member,
   the roller portion further having a plurality of ridges disposed on an outer circumferential surface of the roller portion, at least one of the plurality of ridges extending longitudinally from the first arcuate side of the first hemispherical part towards the first protrusion and not extending from the second arcuate side, at least another one of the plurality of ridges extending longitudinally from the second arcuate side of the second hemispherical part towards the second protrusion and not from the first arcuate side.

2. The animal food dispenser of claim 1, wherein the roller portion includes grooves on an exterior surface thereof.

3. The animal food dispenser of claim 1, wherein the opening is a first opening and the roller portion includes a second opening.

4. The animal food dispenser of claim 3, wherein the second opening is disposed about 180° from the first opening.

5. The animal food dispenser of claim 1, wherein the vertical wall includes a lip portion at an upper end thereof.

6. The animal food dispenser of claim 5, wherein the lip portion is configured to extend inwardly toward an outer circumference of the roller portion so as to maintain the food in the base portion.

7. The animal food dispenser of claim 1, wherein the roller portion includes internal baffles.

8. The animal food dispenser of claim 1, wherein the roller portion includes a partially arcuate outer surface.

9. The animal food dispenser of claim 1, wherein the first hemispherical part has a retention surface that faces in a direction away from the first protrusion, the second hemispherical part has another retention surface that faces in a direction away from the second protrusion, the another retention surface being attachable to the retention surface of the first hemispherical part, the retention surfaces define open ends of the first and second hemispherical parts.

10. The animal food dispenser of claim 9, wherein the base portion includes first and second grooves, and the first and second protrusions being configured to be inserted into the first and second grooves, respectively.

11. The animal food dispenser of claim 9, wherein the base portion includes first and second notches for supporting the first and second protrusions, respectively.

12. The animal food dispenser of claim 11, wherein the first and second protrusions are disposed on the first and second notches, respectively.

13. The animal food dispenser of claim 9, wherein food is stored in the first and second hemispherical portions by accessing the open ends of the first and second hemispherical ends.

14. The animal food dispenser of claim 13, wherein the first and second arcuate side surfaces of the opening extend from the retention surface and the another retention surface, respectively.

* * * * *